United States Patent [19]

Chupp et al.

[11] 4,025,196
[45] * May 24, 1977

[54] ASYMMETRIC DOUBLE PASS GRATING MONOCHROMATOR

[75] Inventors: Vernon L. Chupp, West Covina; Jack J. Duffield, Monrovia, both of Calif.

[73] Assignee: Varian Associates, Palo Alto, Calif.

[ * ] Notice: The portion of the term of this patent subsequent to Nov. 27, 1990, has been disclaimed.

[22] Filed: Mar. 3, 1975

[21] Appl. No.: 555,049

Related U.S. Application Data

[60] Division of Ser. No. 492,499, July 29, 1974, Pat. No. 3,917,403, which is a continuation of Ser. No. 391,605, Aug. 27, 1973, abandoned, which is a division of Ser. No. 230,434, Feb. 29, 1972, Pat. No. 3,775,010.

[52] U.S. Cl. .............................................. 356/101
[51] Int. Cl.² .......................................... G01J 3/18
[58] Field of Search ........................... 356/100, 101

[56] References Cited

UNITED STATES PATENTS 3,775,010  11/1973  Chupp et al. ............... 356/101

Primary Examiner—John K. Corbin
Assistant Examiner—F. L. Evans
Attorney, Agent, or Firm—William W. Haefliger

[57] ABSTRACT

Apparatus to perform correlation spectroscopy utilizes a zero dispersion monochromator having entrance, intermediate and exit slits. A ruled grating is located in the beam path between entrance and exit slits and is operable to disperse a beam of radiation incident thereon both prior and subsequent to radiation passage through the intermediate slit. A first axis is parallel to the grating rulings, the entrance and exit slits symmetrically disposed at opposite sides of a plane bisecting and normal to a line extending between the entrance and exit slits, the plane also passing through the intermediate slit. That axis is located to have intersection with and to extend at an angle Ψ relative to a normal to the plane that passes through said intersection thereby to substantially eliminate spectral overlap. Further, an array of sets of slits is provided adjacent the intermediate slit position of the monochromator, the sets of slits in the array being successively movable into the focal plane at the intermediate slit position.

3 Claims, 7 Drawing Figures

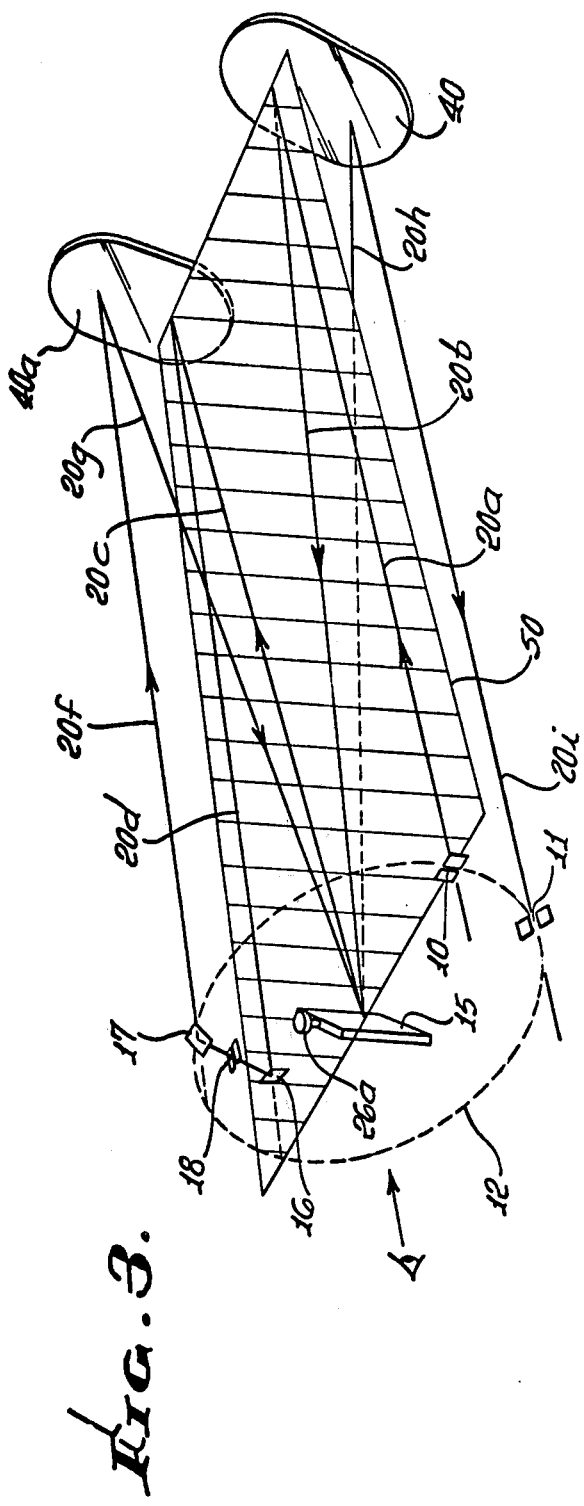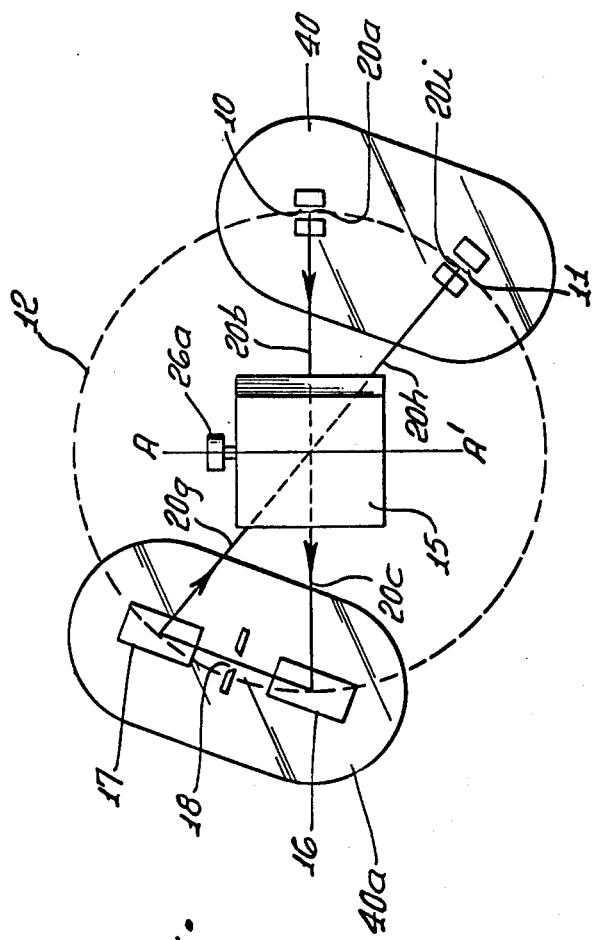

ASYMMETRIC DOUBLE PASS GRATING MONOCHROMATOR

This is a division of application Ser. No. 492,499, filed July 29, 1974, now U.S. Pat. No. 3,917,403, which is a continuation of application Ser. No. 391,605, filed Aug. 27, 1973, now abandoned; which is a division of Ser. No. 230,434 filed Feb. 29, 1972, now U.S. Pat. No. 3,775,010.

BACKGROUND OF THE INVENTION

This invention relates generally to monochromators, and more specifically concerns a double pass grating monochromator which eliminates the need to optically chop at the intermediate slit to prevent spectral overlap, while simultaneously preserving the advantages of invariant slit image curvature and matched Lagrange constants at each pass. The subtractive dispersion arrangement and the selective scattering properties of reflection diffraction gratings results in a monochromator with a second stage which functions to give additional optical filtering but no bandwidth narrowing.

In utilizing grating monochromators as optical filters for spectral instrumentation, it is often desirable to gain additional filtering by arranging the optics so that the light makes more than one pass on the grating. This is usually done by interposing into the beam near the intermediate slit a system of two or more small flat mirrors which function to return the beam for an additional pass on the grating. The advantage of such a double passing scheme over simply adding a second complete monochromator stage, is one of savings of cost and space. Various prior-art schemes for double passing gratings have been devised. If one ignores, for a moment, some of the obvious common problems such as overlapping spectra, back or other order diffraction, and general scatter, these can best be viewed in context with the invention by considering the following three characteristics:

1. Match of slit image and slit curvature as a function of grating angle (or wavelength);
2. Match of Lagrange invariant (see p. 43 of "Applied Optics and Optical Design," A. E. Conrady, Oxford University Press, 1943) on the first and second grating passes; and
3. Dispersion — normally additive (but may be subtractive).

To elaborate briefly, failure to satisfy condition (1) results in loss of resolution, or of energy per spectral band; failure to satisfy condition (2) results in direct loss in energy; and finally, if one fails to arrange the optics so that the second and first pass dispersions are adding condition (3), the entrance and intermediate slits must be narrowed appropriately to pass the desired optical bandwidth, resulting in a corresponding reduced thruput as compared to the additive arrangement. In the subtractive arrangement, since the resolution and dispersion are determined by one pass alone, the entrance and intermediate slits or the intermediate and exit slits, must be carefully matched, controlled and tracked. The "non-resolving" pass functions only to gain additional reduction in background by dispersing again those spurious wavelengths which are scattered during the resolution-controlling pass.

It is a prime purpose of known prior art schemes to gain additional dispersion. Hence condition (3) is satisfied along with either (1) or (2). For example, in U.S. Pat. No. 3,454,339, the arrangement satisfies conditions (3) and (1). In that system, the entrance and exit slits are together offset vertically below the horizontal Ebert plane, and horizontally displaced one on each side of the grating. A pair of perpendicular intermediate flat mirrors, whose line of intersection is parallel to the grating rulings, are inserted in the vicinity of the intermediate slit, one generally above the entrance and one generaly above the exit slit. Because the beam is passed directly behind the grating, it is necessary to move the grating a considerable distance inside the collimator focal plane. This, together with the fact that the grating diffraction angle on pass one and incidence angle on pass two are appreciably different, results in sizable Lagrange mismatch or grating overfill which is a function of wavelength.

In addition to the above problem, another inherent difficulty exists in the scheme of the above patent. It is possible for a particular order of stray radiation to find a reverse path through the intermediate slit and a different order of the same radiation to find a path directly through the exit slit after a second pass on the grating. In some cases this stray radiation can lie within the bandpass of normal order-sorting filters. This problem has been observed experimentally and reported in the technical literature (N. R. Butler, Applied Optics, Vol. 9, No. 6, 1475, June, 1970). As will be shown later, both of the above mentioned problems are solved in the present invention.

Another double passing scheme is described in the Fastie-Sinton U.S. Pat. No. 2,922,331. In this arrangement horizontal beam displacement and image inversion takes place near the intermediate slit image by means of a pair of perpendicular corner mirrors whose line of intersection is parallel to the grating rulings. The spectral overlap problem is solved by means of a pair of additional parallel mirrors which function to cause a vertical displacement in the vicinity of the intermediate slit image. Thus, the second pass is essentially out-of-plane with respect to the grating and incident from the opposite side as the first pass. In this way, additive dispersion is accomplished as well as a good match of Lagrange constant. However, the inversion that provided for additive dispersion also resulted in the inverting of the image curvature in such a way that condition (1), that of invariant slit image curvature with wavelength, is not satisfied. Because of this, the utility of the arrangement is limited by the necessity of either using rather short slits and thus lower thruput, or scanning limited wavelength regions.

SUMMARY OF THE INVENTION

A prime purpose of the present invention is to provide a simple double passing scheme whereby the aforementioned spectral overlap and reverse path diffraction problems are eliminated, while conditions (1) and (2) described above, slit image curvature invariance and match of Lagrange invarient are satisfied. In this regard, a need exists for a monochromator with stray light or background rejection somewhat better than a single monochromator but with no more dispersion than a single monochromator. One of the applications for such a monochromator is fluoroescence spectrophotometry, where one wishes generally to pass a reasonably wide optical band at moderate slit widths. Optical thruput, however, is important and hence a system with invariant slit image curvature and matched Lagrange constants is attractive.

Basically, the invention is defined by the combination in an assymetric, double pass, grating monochromator of a. means forming entrance, intermediate and exit slits to define two successive sections of the monochromator operable to isolate a band of wavelengths with high and low limits, b. a grating in the beam path between the entrance and exit slits and operable to disperse a beam of radiation incident thereon both prir and subsequent radiation passage through the intermediate slit, c. means to rotate the grating about a first axis, which, as is customary, is parallel to the grating rulings, d. the entrance and exit slits symmetrically disposed at opposite sides of a plane bisecting and normal to a line extending between the entrance and exit slits, and e. said axis having intersection with said plane and extending at an angle $\Psi$ relative to a normal to said plane that passes through said intersection, the angle $\Psi$ characterized in that spectral overlap is substantially eliminated.

As will be seen, the angle $\Psi$ may be defined as $\Psi = $ arc sin S/R, and is substantially less than 90°, where $S$ = ½ the length of the line extending between the entrance and exit slits, and $R$ = the distance between the intersection and either of the entrance and exit slits.

Further, means may be provided to hold the grating at the angle $\Psi$ and during grating rotation about the first axis; the widths of the slits may be controlled, as will be seen; and the invention is applicable with unusual advantage to use as a fluorescence monochromator for analytical work or to obtain excitation spectra.

These and other objects and advantages of the invention, as well as the details of an illustrative embodiment, will be more fully understood from the following description and drawings, in which:

DRAWING DESCRIPTION

FIG. 3 is a perspective showing of the FIG. 2 monochromator;

FIG. 4 is a view like FIG. 2, but rotated about an axis normal to the plane of the figure;

DETAILED DESCRIPTION

Figure 1:
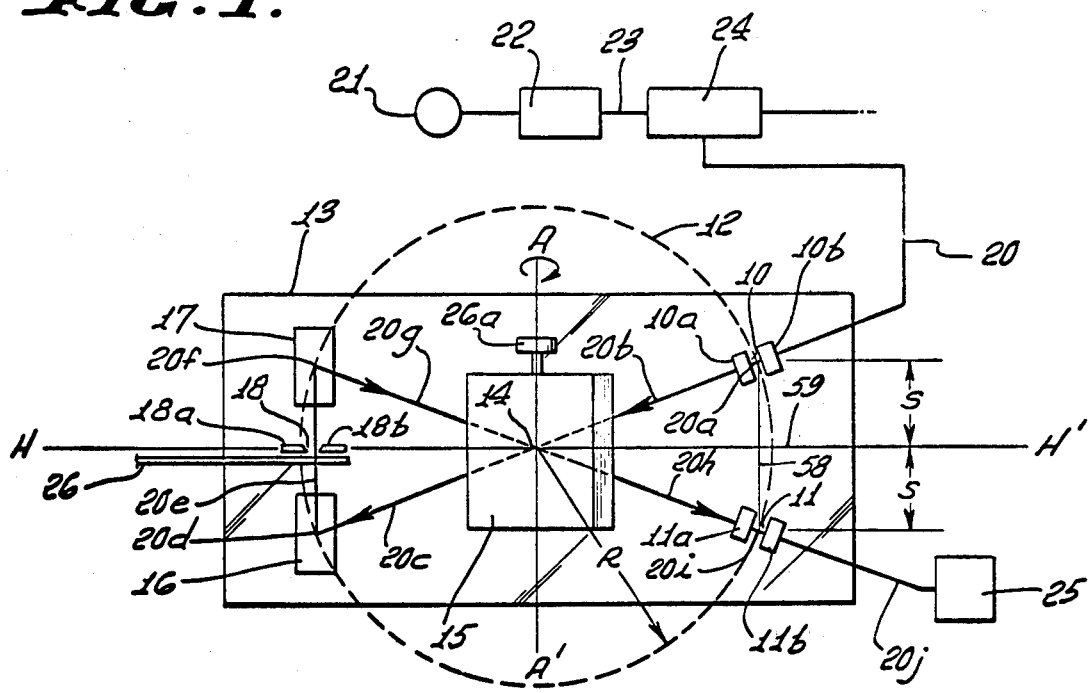
FIG. 1 is an end elevation view of a monochromator which illustrates the problems solved by the present invention.

In describing the invention, reference will be made to the well known basic Ebert-Fastie configuration, although the ideas and benefits are equally applicable to other configurations. The maximum benefit, however, is found in these monochromator systems where the best fit slit at all wavelengths can be described as a circular arc whose radius is constant and independent of grating rotation.

A simple double passing subtractive dispersion scheme is the vertical over-under system. This system is illustrated by viewing end-on in FIG. 1. The entrance and exit slits 10 and 11 lie on the Ebert circle 12 but are symmetrically disposed above and below the horizontal bisector plane H-H'. This plane is defined as the plane containing the center of curvature of the spherical mirror 13 (or mirrors), the center 14 of the Ebert circle and the face of grating 15 and the point 59 bisecting the arc connecting the entrance and exit slits. Also, the plane H-H' is normal to the plane defined by the Ebert circle, and also bisects and is normal to a line 58 interconnecting the entrance and exit slots.

A pair of plane perpendicular corner mirrors 16 and 17, lying in planes whose line of intersection lies in a plane H-H', function to offset the beam vertically, and return it toward the collimator 13 for the second grating pass. The intermediate slit 18 also lies in plane H-H'. The desired radiation paths from mirror 13 to grating 15 can be seen as traveling from above to below plane H-H' on each pass. The slits are defined by jaws 10a and 10b, 11a and 11b, and 18a and 18b.

More specifically, the complete beam path inside the monochromator is indicated in principal ray form as including ray 20a passing from entrance slit 10 to the mirror 13 for reflection as ray 20b passing to the grating for dispersion. Ray 20c passes from the grating to the mirror 13 for reflection as ray 20d passing to diagonal Newtonian corner mirror 16. From the latter the reflected ray 20e passes through slit 18 and to diagonal Newtonian corner mirror 17 for reflection as ray 20f passing to collimator 13. The ray 20g reflected by the latter returns to the grating 15, and ray 20h extends from the grating to mirror 13 for reflection as ray 20i passing through slit 11. In this regard, rays 20a – 20d, and a part of ray 20e extending from mirror 16 to the plane of intermediate slit 18 may be considered as first pass rays, while rays which include the remainder of 20e and 20f – 20i may be considered as second pass rays, providing the double pass monochromator.

As schematically shown, a ray 20 may, for example, emanate as a fluorescence radiation beam from a liquid specimen 24 (in a suitable cell) on which light 23 (isolated by an exciting monochromator for example) is incident. The latter originates at source 21 (which may be a laser) and may pass through optical elements 22, as may include a monochromator, a quarter wave retarder and an electro-optic modulator, as described in copending application by J. J. Duffield and A. Abu-Shumays, Ser. No. 192,815. The radiation exiting from the monochromator (indicated by a ray shown schematically as 20j) passes to a photodetector and associated electronics and recording mechanisms indicated at 25, and described in U.S. Pat. No. 3,013,194 to H. H. Cary. The scattered radiation in beam 20 may be shifted in wavelength from the wavelength of excitation.

It is to be noted that the grating disperses spectra over a wide beam which is oriented generally parallel to and lying below plane H-H' at a level coincident with the exit slit, as illustrated by the shaded area in FIG. 1. Thus, radiation of undesired wavelengths can find a direct path from the entrance slit to the grating and directly out the exit slit without returning to the grating for a second pass. This radiation, when lying within the bandpass of the order sorting filters, is a source of stray light whose intensity could be greater than the signal of interest. This stray light may be called "back diffraction," or "Spectral overlap". This necessitates using A.C. detection with a chopper at the intermediate slit. For this purpose, a rotating beam chopper disc 26 may be located proximate slit 18, to provide for A.C. detection as described in U.S. Pat. No. 2,652,742 to A. Walsh. Even so, the noise caused by the presence of such exorbitant D.C. background stray light can be prohibitive.

A prime purpose of our invention is to retain all of the advantages of the previously described system, while eliminating the serious problem of back diffraction or spectral overlap. FIG. 2 illustrates an end-on view of one embodiment of the invention, with slits and corner mirrors bearing the same numerals and disposed as in FIG. 1, with respect to the horizontal bisector plane H-H'. In both FIGS. 1 and 2, the axis A-A' represents the axis about which the grating is rotated to produce wavelength changes at the exit slit, an actuator to so rotate the grating beam schematically indicated at 26a. In both figures the grating rulings are oriented parallel to axis A-A'.

Figure 2:
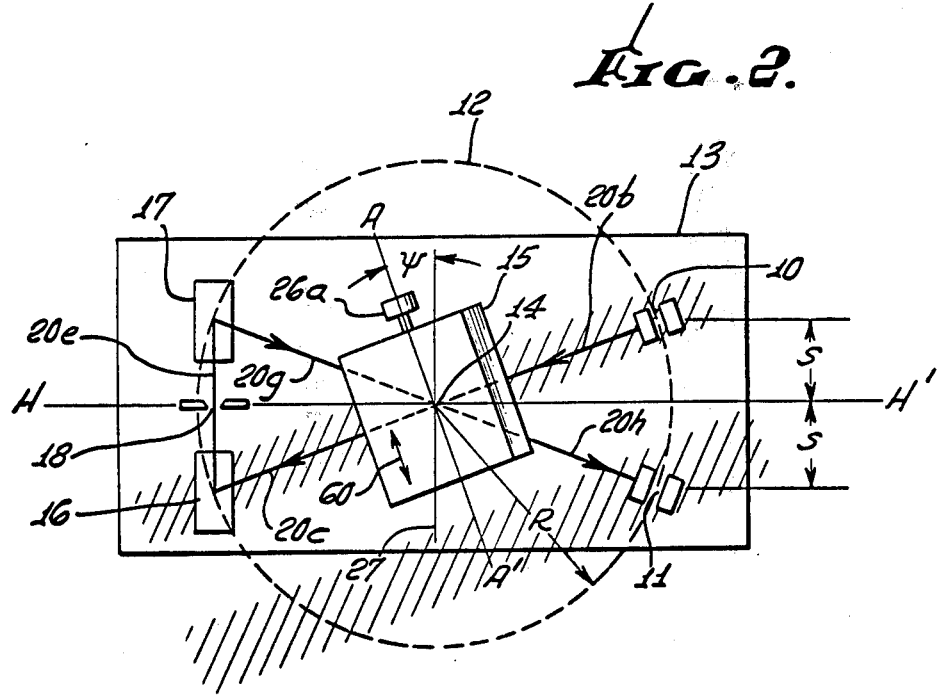
FIG. 2 is an end elevation view of a monochromator incorporating the invention.

A major difference between FIGS. 1 and 2 is that in FIG. 2 the axis A-A' and the grating 15 have been tilted from the vertical (indicated by line 27) through an angle $\Psi$, defined as follows:

$$\Psi = \arcsin(S/R)$$

where
S = the vertical displacement of the entrance and exit slits with respect to the plane H-H', and
R = the radius of curvature of the invariant slit image — in this case the radius of the Ebert circle.

Figure 5:
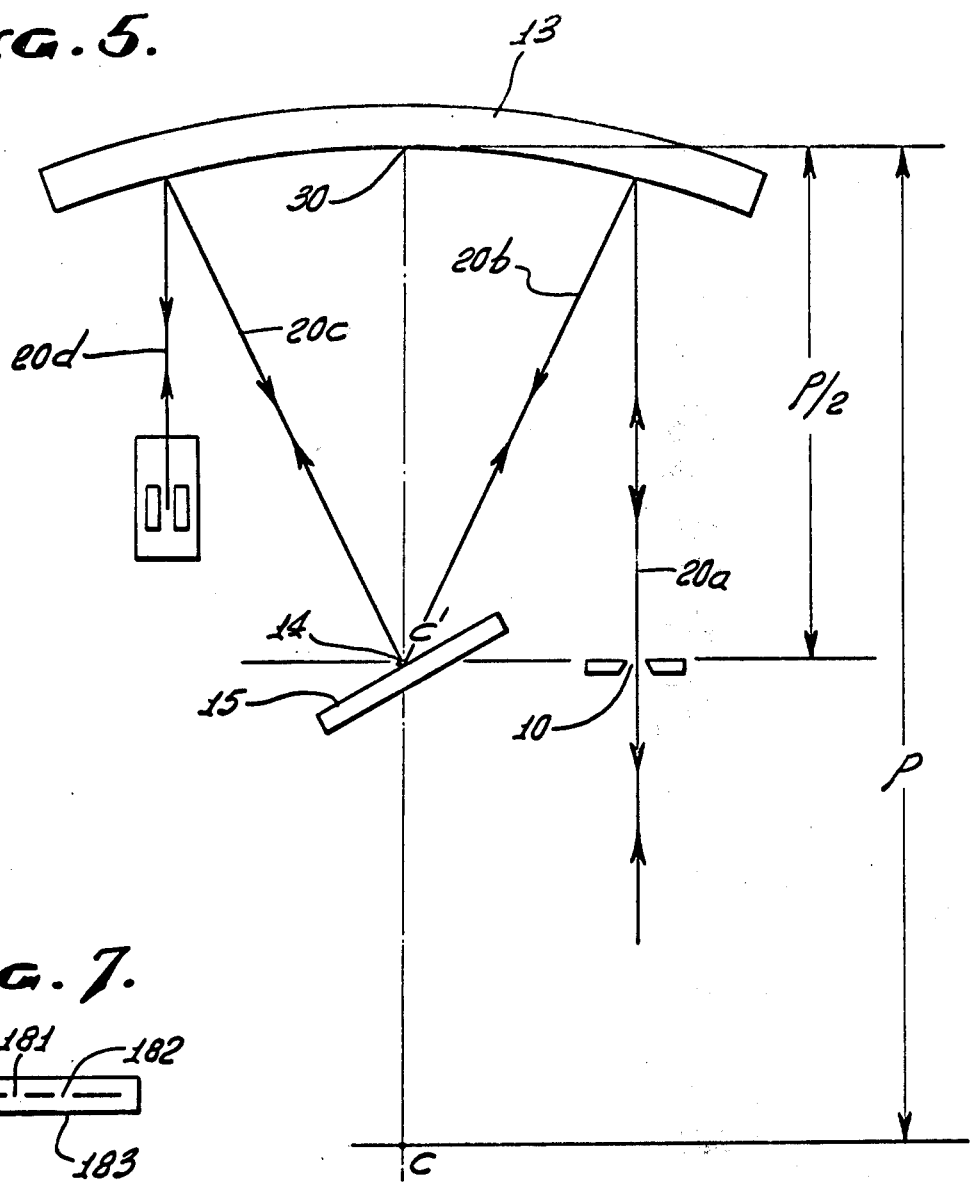
FIG. 5 is a top plan view of the FIG. 2 monochromator.

The proper tilt angle $\Psi$ is realized by rotating the grating about a bisector line C-C' which lies in plane H-H' and is defined as the line connecting the center of the Ebert circle and the center of curvature, c, of the spherical mirror or mirrors, as seen in FIG. 5. Means to so rotate, adjust or hold the grating is indicated schematically at 26a in FIG. 2. In FIG. 5, an extension of line C-C' bisects the angle formed between rays 20b and 20c, and grating 15 lies at about one-half the radius of curvature of collimator 13 and equal to the distance from C to point 30 on the sphere containing the surfaces of the collimator or collimators 13. The direction of the rulings of the plane grating 15, FIG. 2, is indicated by the arrow 60 as parallel to axis A-A'. Also note that axis A-A' intersects plane H-H' at 14, and extends at angle $\Psi$ from the normal 27 to plane H-H' and generally in or parallel to the plane of the Ebert circle.

It will be noted in FIGS. 2 – 5 that the rays in both first and second passes are inclined at the angle $\Psi$ with respect to the plane H-H'. First pass back-diffracted light then returns harmlessly to the entrance slit, as illustrated by the upper shaded area in FIG. 2, and the second pass diffraction, illustrated by the lower shaded area, occurs below any optical elements except the exit slit out of which it is intended to pass; thus its "back-diffracted" content is harmlessly lost. In this way, the spectral overlap problem is solved without the necessity of A.C. detection with chopping at the intermediate slit, since the only geometrical path of diffracted radiation through the exit slit is the intended path.

While an A.C. detection system might be expected to result in yet further reduction in stray light, as this would distinguish between signal and the non-directonal scatter component which is scattered out of the spectral beam directly to the exit slit as a result of incident white light falling on imperfections of mirror 13 and grating 15 on the first grating pass, experimental data indicates that a reflection grating scatters far more intensely in the plane of spectral beam than in other directions. This observation is confirmed by the following statement found in the Fastie-Sinton U.S. Pat. No. 2,922,331, page 7, lines 51 – 60: "It is the property of many reflection diffraction gratings that they scatter radiation in a special way, namely the scattered light remains in the spectrum. For example, at a particular point in the spectrum where the wavelength $\lambda$ should appear, all other wavelengths present in the spectrum will also appear in small amounts. However, above or below the spectrum, no radiation will appear. In contrast, prism or transmission gratings scatter all wavelengths in all directions so that scattered light appears above and below and within the spectrum of a prism spectrograph." While we do not concur that no radiation appears above or below the spectrum with reflection gratings, we have found this component to be far less than the stray component found within the spectrum.

Because of the grating orientation on the second pass relative to the inverting of the slit image by the collimator, all wavelengths within the pass band of the intermediate slit will reappear at the exit slit. This is radiation which passes through the intermediate slit by means of desired grating diffraction. However, the previously described stray component, which passes through the intermediate slit by means of scattering, will for the most part contain wavelengths outside the monochromator pass band and hence will be largely diffracted by the second grating pass away from the exit slit. Thus the prime objective of our double passing scheme, additional filtering but no additional dispersion, is realized even without intermediate slit chopping. The other previously mentioned advantages, of invariant slit image curvature and matched Lagrange constant, are simultaneously preserved.

Figure 6:
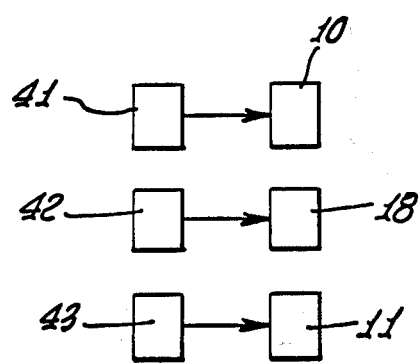
FIG. 6 is a schematic diagram, as in FIG. 7.

Since the resolution and dispersion of such monochromator are determined by one grating pass alone, our invention can be viewed as a single grating monochromator with added stray light filtering. It is preferable that this be the first pass, since, as is illustrated in FIGS. 3 and 4, the first pass is a simple in-plane Ebert-Fastie monochromator whose high quality imaging and resolution characteristics are well known. The second pass then becomes a vertical over-under Ebert-Fastie system. Plane 50 cross-hatched in FIG. 3 is defined by rays 20b and 20c, as well as by rays 20a and 20d. To ease alignment, the exit slit jaws can be opened somewhat wider than the other slits, and without serious loss of its stray light filtering effect. Obviously, the entrance and exit slits, for simplicity, may be mounted on the same mechanism, and for reasons of mechanical stability it is often desirable to mount mirrors 16 and 17 and the mechanism of intermediate slit 18 on an extension of this same mechanism. Similarly, collimating mirrors 40 and 40a which, although shown separately, perform the function of mirror 13, may have a common support. In one embodiment all three slits are bilaterally adjusted in a common direction, H-H', as in FIG. 2, FIG. 6 schematically showing means 41–43 to so adjust the slits.

It should be noted that another source of stray light not previously mentioned, that of multiple dispersion, can be totally avoided by choosing the grating beam angle and/or collimator mirror angles such that the first pass continua of any order of diffraction do not return to the grating face. Mathematical conditions which must be met to satisfy this condition have been previously described in the technical literature (V. L. Chupp, Applied Optics, Vol. 8, No. 5,925 (May 1969) and J. K. Pribam and C. M. Penchina, Applied Optics, 7,2005 (1968). For example, in an f/7 Ebert-Fastie system, the total beam angle between the principal rays at the grating should be approximately 25°.

Figure 7:
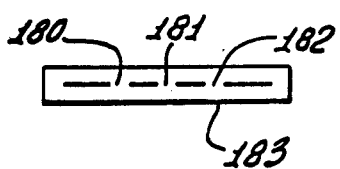

The disclosed monochromator has application to multi-slit arrangements, as for example a zero-dispersion monochromator with complex arrays of slits. For example, the intermediate slit might be designed to pass a number of lines or absorption bands of a specific compound, so that high signal-to-noise ratio and analytical discrimination could be obtained in a specific analysis. In FIG. 7 an array of slits 180, 181 and 182 is shown as extending in a focal plane, as for example that of the intermediate slit of a zero dispersion monochromator. The carrier 183 for the slits may move them successively into the position of slit 18 in FIG. 1, for example. This has application, for example, to the analysis of air pollution components, and has the further advantage that a number of components could be analysed by providing a number of special slit arrangements in the intermediate position adapted for each component, to be successively or simultaneously located in the plane of the intermediate slit.

Furthermore, the disclosed monochromator arrangement may be used with particular advantage in connection with copending Roland C. Hawes application Ser. No. 194,796, now U.S. Pat. No. 3,748,040, entitled "HIGH RESOLUTION OR HIGH BANDWIDTH MONOCHROMATOR".

I claim:

1. In apparatus to perform correlation spectroscopy utilizing a zero dispersion monochromator that includes entrance, intermediate and exit slits, a ruled grating in the beam path between the entrance and exit slits and operable to disperse a beam of radiation incident thereon both prior and subsequent to radiation passage through the intermediate slit, there being a first axis which is parallel to the grating rulings, the entrance and exit slits symmetrically disposed at opposite sides of a plane bisecting and normal to a line extending between the entrance and exit slits, the plane also passing through the intermediate slit, the combination that includes:
   a. said axis located to have intersection with and to extend at an angle $\Psi$ relative to a normal to said plane that passes through said intersection thereby to substantially eliminate spectral overlap,
   b. means providing an array of sets of slits adjacent the intermediate slit portion of the monochromator and,
   c. the sets of slits in the array being successively movable into the focal plane at said intermediate slit position.

2. In a zero dispersion monochromator having entrance, intermediate and exit slits, a ruled grating in the beam path between the entrance and exit slits and operable to disperse a beam of radiation incident thereon both prior and subsequent to radiation passage through the intermediate slit, means to rotate the grating about a first axis which is parallel to the grating rulings, the entrance and exit slits symmetrically disposed at opposite sides of a plane bisecting and normal to a line extending between the entrance and exit slits, the plane also passing through the intermediate slit, the combination that includes:
   a. said axis located to have intersection with and to extend at an angle $\Psi$ relative to a normal to said plane that passes through said intersection, thereby to substantially eliminate spectral overlap, said angle having the approximate value $\arcsin S/R$
   where
      $S =$ one-half the length of said line extending between the entrance and exit slits, and
      $R =$ the distance between said intersection and the center of either of the entance and exit slits
   b. an array of sets of apertures for isolating multiple lines or bands of substances to be analysed, and
   c. said array being located proximate the locus of said intermediate slit and movable to cause a selected set of the apertures to define said intermediate slit.

3. In an asymmetric, double pass, grating monochromator, the combination that includes:
   a. entrance, intermediate and exit slits to define successive sections of the monochromator,
   b. a grating in the beam path between the entrance and exit slits and operable to disperse a beam of radiation incident thereon both prior and subsequent to radiation passage through the intermediate slit, the grating having rulings,
   c. there being a first axis which is parallel to the grating rulings,
   d. the entrance and exit slits symmetrically disposed at opposite sides of a plane bisecting and normal to a line extending between the entrance and exit slits, said plane also passing through the intermediate slit,
   e. said axis located to have intersection with said plane and to extend at the angle $\Psi$ relative to a normal to said plane that passes through said intersection, the angle characterized in that spectral overlap is substantially eliminated and defined as having the approximate value $\arcsin S/R$
   where
      $S =$ one-half the length of said line extending between the entrance and exit slits, and
      $R =$ the distance between said intersection and the center of either of the entrance and exit slits,
   f. a set of apertures for isolating multiple lines or bands of a substance to be analysed, and
   g. said set located so as to constitute said intermediate slit to cause the set of apertures to select wavelengths corresponding to said lines or bands,
   h. the selected wavelengths being recombined on the second pass through the monochromator so as to pass out a single exit slit.

* * * * *